United States Patent
Kozak et al.

(10) Patent No.: US 9,530,226 B2
(45) Date of Patent: Dec. 27, 2016

(54) SYSTEMS AND METHODS FOR OPTIMIZING N DIMENSIONAL VOLUME DATA FOR TRANSMISSION

(71) Applicant: PAR Technology Corporation, New Hartford, NY (US)

(72) Inventors: Mark Kozak, Deerfield, NY (US); Jimmy Wu, Rome, NY (US); Jeffrey Downs, Rochester, NY (US)

(73) Assignee: PAR TECHNOLOGY CORPORATION, New Hartford, NY (US)

(*) Notice: Subject to any disclaimer, the term of this patent is extended or adjusted under 35 U.S.C. 154(b) by 4 days.

(21) Appl. No.: 14/625,587

(22) Filed: Feb. 18, 2015

(65) Prior Publication Data

US 2015/0235385 A1 Aug. 20, 2015

Related U.S. Application Data

(60) Provisional application No. 61/941,301, filed on Feb. 18, 2014.

(51) Int. Cl.
| | |
|---|---|
| G06T 9/00 | (2006.01) |
| G06T 9/40 | (2006.01) |
| G06K 9/36 | (2006.01) |
| G06K 9/46 | (2006.01) |
| H04N 1/64 | (2006.01) |

(52) U.S. Cl.
CPC . *G06T 9/40* (2013.01); *G06K 9/36* (2013.01); *G06K 9/46* (2013.01); *G06T 9/00* (2013.01); *H04N 1/64* (2013.01)

(58) Field of Classification Search
None
See application file for complete search history.

(56) References Cited

U.S. PATENT DOCUMENTS

| | | | | | |
|---|---|---|---|---|---|
| 4,694,404 | A | * | 9/1987 | Meagher | G06T 9/40 345/421 |
| 4,975,769 | A | * | 12/1990 | Aizu | H04N 1/6019 358/517 |

(Continued)

FOREIGN PATENT DOCUMENTS

| | | | | |
|---|---|---|---|---|
| EP | 1672590 A2 | * | 6/2006 | G06T 15/00 |
| WO | WO 0167776 A1 | * | 9/2001 | H04N 19/63 |

(Continued)

OTHER PUBLICATIONS

Du, R., Lee, H.J., A Novel Compression Alogrithm for LiDAR Data, 5th International Congress on Image and Signal Processing, 2012, pp. 987-991.

(Continued)

*Primary Examiner* — Utpal Shah
(74) *Attorney, Agent, or Firm* — Bond Schoeneck & King, PLLC; George McGuire; Jonathan Gray

(57) ABSTRACT

A method and system for optimizing N dimensional volume data for transmission is disclosed. The device and method including organizing points based on XYZ location, into volumes, which are recursively divided by N into smaller volumes, where N is greater than 1, and decompressing each volume, by encoding a reference volume then encoding the remaining volumes as a distance from the reference cuboid or the most recently recorded cuboid.

18 Claims, 6 Drawing Sheets

(56) References Cited

U.S. PATENT DOCUMENTS

| | | | | |
|---|---|---|---|---|
| 5,255,090 A * | 10/1993 | Israelsen | G06T 9/008 | 341/67 |
| 5,282,255 A * | 1/1994 | Bovik | H04N 19/94 | 375/240.01 |
| 5,412,763 A * | 5/1995 | Knoplioch | G09G 1/06 | 345/419 |
| 5,468,069 A * | 11/1995 | Prasanna | G06T 9/008 | 358/1.9 |
| 5,544,284 A * | 8/1996 | Allebach | H04N 1/644 | 345/603 |
| 5,850,226 A * | 12/1998 | Nagasawa | G06T 15/10 | 345/419 |
| 5,909,681 A * | 6/1999 | Passera | G06F 9/5027 | |
| 6,567,081 B1 * | 5/2003 | Li | G06T 9/007 | 345/419 |
| 6,631,240 B1 * | 10/2003 | Salesin | G06T 9/40 | 348/E7.071 |
| 6,674,911 B1 * | 1/2004 | Pearlman | G06T 9/40 | 375/240.19 |
| 7,133,041 B2 * | 11/2006 | Kaufman | G06T 15/005 | 345/419 |
| 7,373,473 B2 | 5/2008 | Bukowski | | |
| 7,392,248 B2 * | 6/2008 | Bakalash | C03B 37/02718 | |
| 8,204,313 B2 | 6/2012 | Wheeler | | |
| 2002/0080232 A1 * | 6/2002 | Hiratsuka | G06T 3/4007 | 348/51 |
| 2002/0118206 A1 * | 8/2002 | Knittel | G06F 12/0875 | 345/557 |
| 2003/0038798 A1 * | 2/2003 | Besl | G06T 15/00 | 345/420 |
| 2003/0052878 A1 * | 3/2003 | Han | G06T 17/005 | 345/420 |
| 2003/0214502 A1 * | 11/2003 | Park | G06T 15/205 | 345/420 |
| 2004/0150639 A1 * | 8/2004 | Park | G06T 9/40 | 345/419 |
| 2004/0217956 A1 * | 11/2004 | Besl | G06T 15/00 | 345/419 |
| 2004/0249617 A1 * | 12/2004 | Lau | G06T 17/20 | 703/2 |
| 2005/0052466 A1 * | 3/2005 | Frazer | H04N 1/6019 | 345/604 |
| 2005/0180340 A1 * | 8/2005 | Lee | G06T 9/40 | 370/258 |
| 2005/0195191 A1 * | 9/2005 | Lee | G06T 9/40 | 345/424 |
| 2006/0077203 A1 * | 4/2006 | Neto | G06T 17/00 | 345/419 |
| 2006/0235666 A1 * | 10/2006 | Assa | G01V 11/00 | 703/10 |
| 2007/0206006 A1 * | 9/2007 | Lee | G06T 17/005 | 345/420 |
| 2008/0043300 A1 * | 2/2008 | Toura | H04N 1/6019 | 358/525 |
| 2009/0136096 A1 * | 5/2009 | Sirohey | G06T 7/0012 | 382/128 |
| 2010/0239178 A1 | 9/2010 | Osher | | |
| 2011/0010400 A1 | 1/2011 | Hayes | | |
| 2011/0202538 A1 | 8/2011 | Salemann | | |
| 2011/0216063 A1 | 9/2011 | Hayes | | |
| 2012/0124113 A1 | 5/2012 | Zalik | | |
| 2012/0290542 A1 | 11/2012 | Trotta | | |
| 2012/0313927 A1 | 12/2012 | Curington | | |
| 2013/0011079 A1 * | 1/2013 | Kirmse | G06F 17/30241 | 382/284 |
| 2013/0046471 A1 | 2/2013 | Rahmes | | |
| 2013/0086215 A1 | 4/2013 | Trotta | | |
| 2013/0249899 A1 * | 9/2013 | Meeussen | G06T 17/05 | 345/419 |
| 2013/0321593 A1 * | 12/2013 | Kirk | G06T 15/04 | 348/51 |
| 2015/0071527 A1 * | 3/2015 | Meir | G06T 7/0046 | 382/154 |
| 2015/0373372 A1 * | 12/2015 | He | H04N 19/13 | 375/240.12 |

FOREIGN PATENT DOCUMENTS

| | | | | |
|---|---|---|---|---|
| WO | WO 0248966 A1 * | 6/2002 | | G06Q 50/22 |
| WO | 2004036246 | 4/2004 | | |

OTHER PUBLICATIONS

Johnson, A.E., Manduchi, R., Probabilistic 3D Data Fusion for Adaptive Resolution Surface Generation, Proceedings of the First International Symposium on 3D Data Processing Visualization and Transmission, 2002.

Lipus, B., Zalik, B., Lossy LAS File Compression Using Uniform Space Division, Electronics Letters, 2012, vol. 48, No. 20.

Mongus, D., Spelic, D., Zalik, B., Rupnik, B., Geometry Compression of Scanned Point-Clouds, 2nd International Conference on Software Technology and Engineering, 2010, pp. V1-279-V1-282.

Wiman, H., Qin, Y., Fast Compression and Access of LiDAR Point Clouds Using Wavelets, Urban Remote Sensing Joint Event, 2009.

Zhang, Y., Li, X., Hua, D., Chen, H., Jin, H., An Lidar Data Compression Method Based on Improved LZW and Huffman Algorithm, International Conference on Electronics and Information Engineering, 2010, pp. V2-250-V2-254.

International Search Report Form PCT/ISA/220, International Application No. PCT/US2014/015949, pp. 1-10, Dated May 22, 2014.

* cited by examiner

SYSTEMS AND METHODS FOR OPTIMIZING N DIMENSIONAL VOLUME DATA FOR TRANSMISSION

RELATED APPLICATION DATA

The present application claims the benefit of U.S. provisional patent application No. 61/941,301, filed Feb. 18, 2014, which is hereby incorporated by reference in its entirety.

FIELD OF THE INVENTION

This disclosure relates generally to systems and methods for optimizing N dimensional volume data for transmission, and more specifically to methods and systems for optimizing N dimensional volume data for transmission by ordering the data in a data structure and decomposing the data structure.

BACKGROUND

LiDAR is an acronym for Light Detection and Ranging. As it pertains to the geospatial industry, LiDAR generally refers to an airborne, near infra-red laser that scans the surface of the earth to produce highly accurate horizontal and vertical data points that define the shape of the earth and elevations of above ground features.

The volume of data being collected from LiDAR sensors is growing at a very fast rate. With the growing capabilities of full waveform and multi-spectral sensors, a single collection can yield a terabyte of data. Often the data is stored in one location, and is needed for analysis in another. Due to the size of the data received from the LiDAR, transmitting the entire data set is inefficient, and not required in every application. Accordingly, a system for identifying, extracting, compressing, and delivering a minimum amount of data in a compressed format is needed.

BRIEF SUMMARY OF THE INVENTION

The present disclosure is directed to inventive methods and systems for optimizing N dimensional volume data for transmission. Accordingly, various embodiments provide a system for identifying, extracting, compressing, and delivering the minimum amount of data in a compressed format. The embodiments presented allow allows preliminary analysis to be done with as little as 0.01% (1/100 of 1 percent) of the bytes required for a LAS file covering the same area. According to an an aspect of the invention, a method of preparing a plurality of data points for transmission, comprising: receiving a plurality of data points defining an N dimensional volume, such that each data point exists within a location in the volume; parsing the N dimensional volume into a plurality of parent cuboids of a first predetermined dimension; parsing each parent cuboid into a plurality of child cuboids of a second predetermined dimension, wherein the second predetermined dimension is a factor of the first predetermined dimension; and mapping each data point to the child cuboid containing the location of the data point in the N dimensional volume.

According to an embodiment, the method further comprises the steps of: encoding the origin of at least one parent cuboid as a first reference cuboid; encoding the distance from the first reference cuboid to another parent cuboid containing a data point; encoding each remaining parent cuboid containing a data point as a distance from the most recently encoded parent cuboid; encoding, for each encoded parent cuboid, the origin of a child reference cuboid; encoding the distance from the child reference cuboid to another child cuboid containing a data point for each encoded parent cuboid; and encoding each remaining child cuboid containing a data point as a distance from the most recently encoded child cuboid.

According to an embodiment, the origin of the second reference cuboid is encoded as a distance from the origin of the parent cuboid.

According to an embodiment, each remaining parent cuboid is encoded in ascending order according to its position in the N dimensional volume.

According to an embodiment, each remaining child cuboid is encoded in ascending order according to its position in the parent cuboid.

According to an embodiment, the method further comprises the step of transmitting the encoded data.

According to an embodiment, each encoded child cuboid having a negative distance from the previously encoded cuboid is encoded as a distance from a predetermined position having a positive distance value.

According to an embodiment, the method further comprises the step of encoding, for each data point, remaining location data in the child cuboid wherein the data point is mapped.

According to an embodiment, the method further comprises the step of further encoding the intensity of the data point, the number of returns of the data point, and the scan angle of the data point.

According to another aspect, a method of preparing a plurality of data points for transmission, comprising: receiving a plurality of data points defining an N dimensional volume, such that each data point exists within a location in the volume; ordering the received data points into a data structure dividing the N dimensional volume into a plurality of parent cuboids, wherein each parent cuboid further contains a plurality of child cuboids; encoding the origin of at least one parent cuboid as a first reference cuboid; encoding the distance from the first reference cuboid to another parent cuboid containing a data point; encoding each remaining parent cuboid containing a data point as a distance from the most recently encoded parent cuboid; encoding, for each encoded parent cuboid, the origin of a child reference cuboid; encoding the distance from the child reference cuboid to another child cuboid containing a data point for each encoded parent cuboid; and encoding each remaining child cuboid containing a data point as a distance from the most recently encoded child cuboid.

According to an embodiment, the method wherein the step of ordering the received data points, comprises the steps of: parsing the N dimensional volume into a plurality of parent cuboids of a first predetermined dimension; parsing each parent cuboid into a plurality of child cuboids of a second predetermined dimension, wherein the second predetermined dimension is a factor of the first predetermined dimension; and mapping each data point to the child cuboid containing the location of the data point in the N dimensional volume.

According to an embodiment, the data structure is an octree data structure.

According to an embodiment, the origin of the second reference cuboid is encoded as a distance from the origin of the parent cuboid.

According to an embodiment, each remaining parent cuboid is encoded in ascending order according to its position in the N dimensional volume.

According to an embodiment, each remaining child cuboid is encoded in ascending order according to its position in the parent cuboid.

According to an embodiment, the method further comprises the step of transmitting the encoded data.

According to an embodiment, each encoded child cuboid having a negative distance from the previously encoded cuboid is encoded as a distance from a predetermined position having a positive distance value.

According to an embodiment, the method further comprises the step of encoding, for each data point, remaining location data in the child cuboid wherein the data point is mapped.

According to an embodiment, the method further comprises the step of further encoding the intensity of the data point, the number of returns of the data point, and the scan angle of the data point.

According to another aspect, a nontransitory storage medium storing program code configured to prepare a plurality of data points for transmission, comprising: program code for receiving a plurality of data points defining an N dimensional volume, such that each data point exists within a location in the volume; program code for parsing the N dimensional volume into a plurality of parent cuboids of a first predetermined dimension; program code for parsing each parent cuboid into a plurality of child cuboids of a second predetermined dimension, wherein the second predetermined dimension is a factor of the first predetermined dimension; program code for mapping each data point to the child cuboid containing the location of the data point in the N dimensional volume; program code for encoding the origin of at least one parent cuboid as a first reference cuboid; program code for encoding the distance from the first reference cuboid to another parent cuboid containing a data point; program code for encoding each remaining parent cuboid containing a data point as a distance from the most recently encoded parent cuboid; program code for encoding, for each encoded parent cuboid, the origin of a child reference cuboid; program code for encoding the distance from the child reference cuboid to another child cuboid containing a data point for each encoded parent cuboid; and program code for encoding each remaining child cuboid containing a data point as a distance from the most recently encoded child cuboid.

These and other aspects of the invention will be obvious from the figures and detailed description below.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

The present disclosure describes a system and method to compress LiDAR point data such that it is optimized for streaming over a bandwidth limited network, with the end goal of performing exploitation and analysis on the data. However, one of ordinary skill in the art will readily recognize that this system and method may be applied to any context, besides LiDAR, requiring the transmittal of a plurality of data points defining an N dimensional volume over a bandwidth limited network. In an exemplary embodiment, the N dimensional volume is a three dimensional volume. Because the system and method optimizes the data for exploitation and analysis on the data, it differs from other point streaming systems and methods which are optimized for the visualization of the point data. The resulting advantages of this system and method will be readily apparent to a person of ordinary skill in the art.

Figure 1:
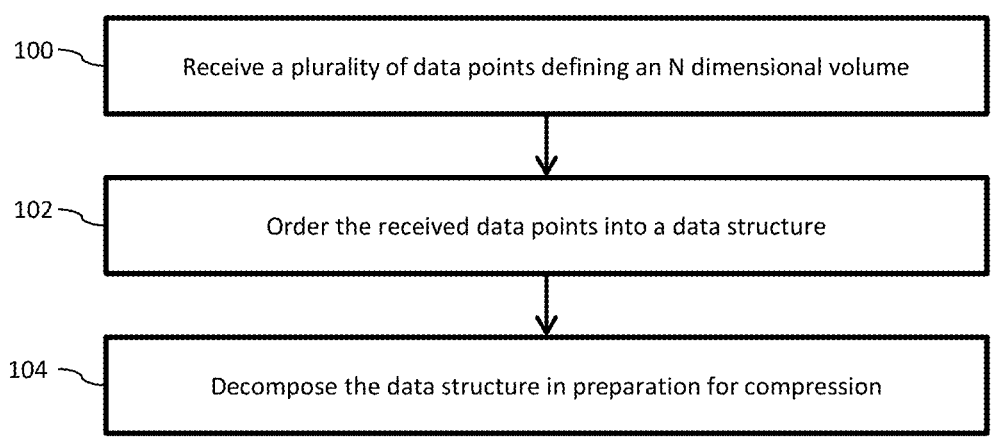
FIG. 1 shows a method according to an embodiment.

Referring now to the drawings wherein like reference numerals refer to like parts throughout, there is seen in FIG. 1 an embodiment of an algorithm for optimizing data points. In step 100, data is received from a device, such as a LiDAR system, in the form of data points defining a three dimensional volume. In an exemplary embodiment, the data is received as a collection of data points. An example set of such data points may be seen in Appendix A. In an exemplary embodiment, these points may be received in a Cartesian type of coordinate system where the unit of measure can be readily scaled in decimal form. UTM is one such system, where the unit of measure is typically meters and can be scaled up or down by dividing or multiplying by powers of 10. However, UTM is not the only compatible system. If the data has been received in a coordinate system other than a Cartesian coordinate system, the data may be transformed into a Cartesian system. Additionally, even if the data has been received as a Cartesian system, it may be transformed into an alternate Cartesian system if another is more desirable.

Figure 3:
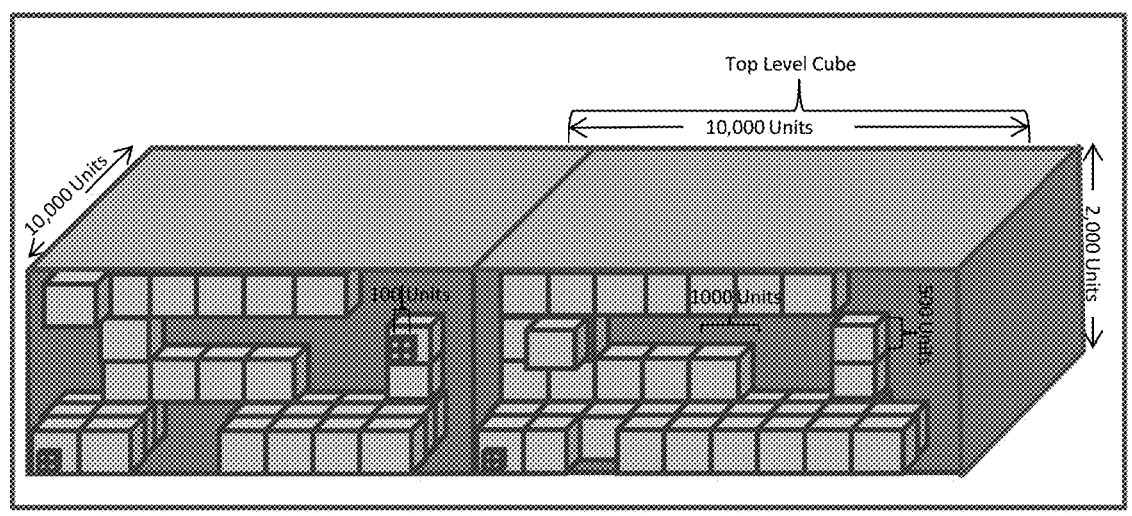
FIG. 3 shows a data structure according to an embodiment.

In step 102, the received data is ordered into a data structure. In an exemplary embodiment, the received data is ordered into a Sparse N-ary Square Cuboid (NSC) data structure. As shown in FIG. 3, NSC organizes points based on XYZ location, into volumes, which are recursively divided by N into smaller volumes, where N is greater than 1. The largest, top level, cuboids are referred to as parent cuboids. Each parent cuboid contains a set of smaller cuboids, referred to as child cuboids. As described above, the child cuboids are dimensioned as an integer factor of the parent cuboids. While the volumes are cuboids in the Sparse N-ary Square Cuboid data structure, other similar data structures using different volume, such as a hyper-cube, may be used. Similarly, one of ordinary skill will recognize that other data structures, such as octree, may also be employed. It will also be recognized that although volumes, such as cuboids, are used to describe the data structure, other forms, such as a tree, may be employed to describe the same data structure.

Figure 2:
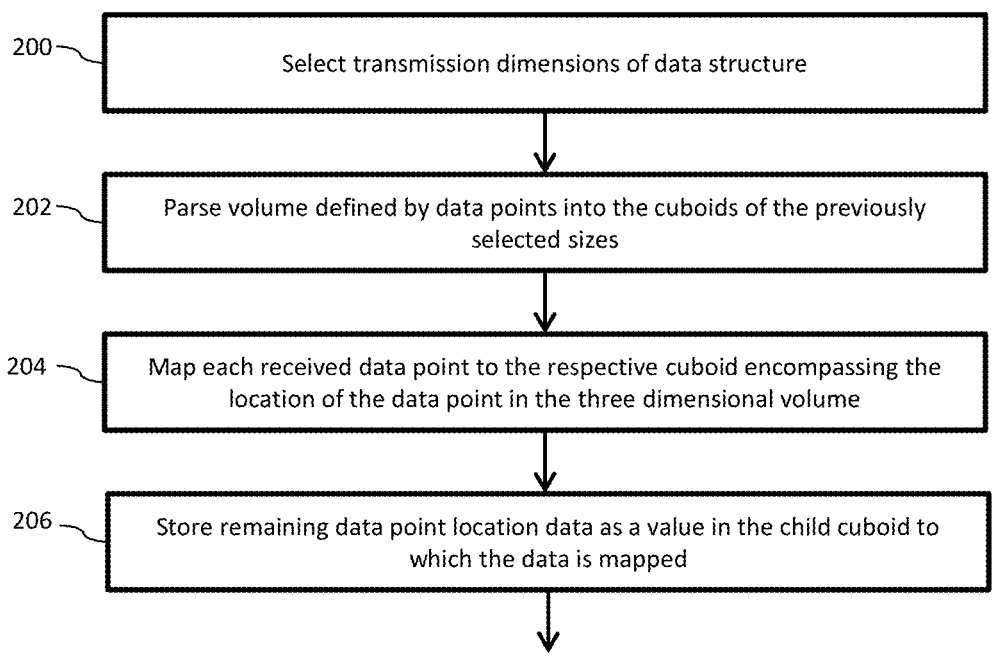
FIG. 2 shows a method according to an embodiment.
Figure 5A:
FIG. 5A shows a photograph of example terrain subjected to various levels of data processing according to an embodiment.
Figure 5B:
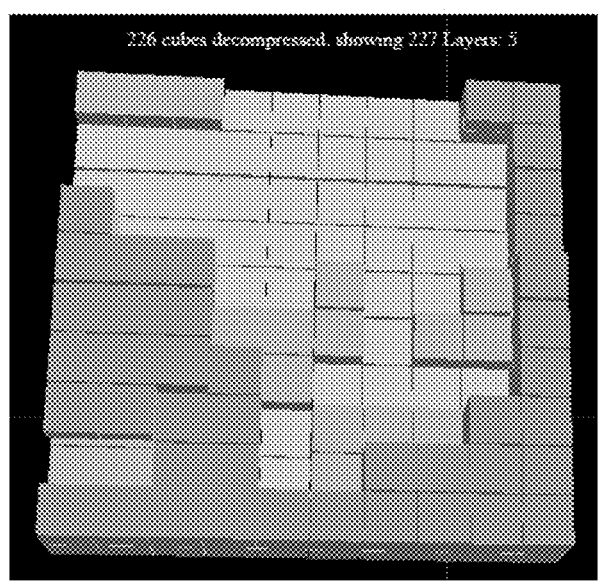
FIG. 5B shows the breaking up of the example of terrain shown in FIG. 5A into a particular level of cuboids per data processing according to an embodiment.
Figure 5C:
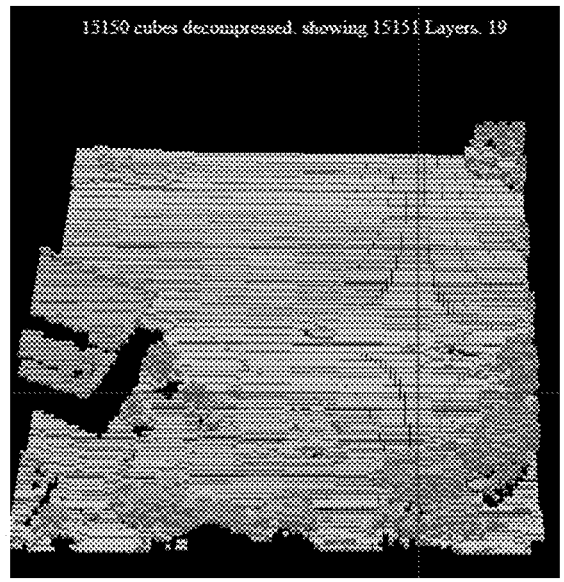
FIG. 5C shows the breaking up of the example of terrain shown in FIG. 5A into a particular level of cuboids per data processing according to an embodiment.
Figure 5D:
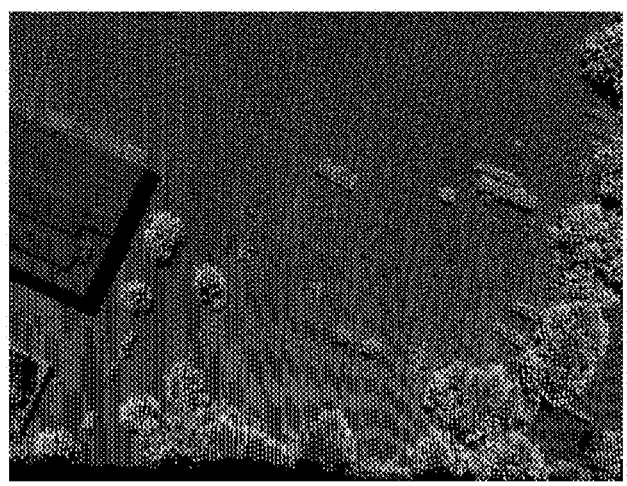
FIG. 5D shows the breaking up of the example of terrain shown in FIG. 5A into a particular level of cuboids per data processing according to an embodiment.

Referring to FIG. 2, an embodiment of a method of ordering the received data into a Sparse N-ary Square Cuboid, or similar data structure, is shown. First, in step 200, the dimensions of transition cuboid are selected. The transmission dimensions define the size of the area which will be streamed to the client as a compressed data packet, and each of the resolution levels (the size of each level of cuboids). In an exemplary embodiment, the size is selected in order to balance optimization for streaming and optimization for compression. For example, FIG. 5A through 5D shows an example of terrain as it may be broken into various levels of cuboids. FIG. 5A shows a photograph of example terrain subjected to various levels of data processing according to an embodiment. FIG. 5B shows the terrain ordered as it might appear if it were ordered into the first parent level. This is the coarsest level of processing, and also the most efficient to process and transmit. In certain applications, they level of processing may be sufficient. For example, this level of processing may be useful for finding a flat area, such a helicopter searching for a sufficient landing zone. FIGS. 5C and 5D show increasing levels of resolution (i.e. extra levels of cuboids). These levels may be required for applications requiring greater levels of detail. The varying applications and respective levels of resolution required should be appreciated to a person of ordinary skill in the art.

Selecting the transmission dimensions require that the size of the parent level cuboid be selected, as well as the value of N, and the number of recursions (levels). The size of the parent level cuboid and the selected value of N may be limited by the base of the cuboid. For example, in a denary cuboid, the top level cuboid must be a multiple of ten, and the value of N must be an integer value between one and ten. (This assumes that the units being used are metric. For example, if a different set of units, such as inches were used, the integer value would need to be between one and twelve). In an exemplary embodiment, recursion is stopped when the unit of measure of the data points has been scaled down to two significant digits. Using the UTM example, assuming that points are recorded with a 0.01 meter precision, recursion is stopped when the cuboid be represent up to 99 centimeters, or 2 significant digits. As an example of this step, the top level cuboid may be selected as 10,000 units, or 100 meters in the X and Y directions and the Z dimension as 20 meters. In other words, the vertical ranges used for the z values are 0 to 19.99, 20.0 to 39.99, as well as a negative range of −20 to −0.01. Thus, for the purposes of example, the top level cuboid is selected as a 100 meter×100 meter×20 meter cuboid. The next level of tessellation may be selected as, for example, 10 meter horizontal and 5 meters vertical cuboid, and the next level as 1 meter cubes (implying that each of the six sides are all equal). A graphic representation of tessellated cuboids using provided in FIG. 3.

In step 202, once the appropriate dimensions have been defined, the volume defined by the data points is parsed into the selected cuboids (or other cuboids in alternate embodiments). This step may include the step of first defining the area to parse into cuboids, which will often extend beyond the edges of the area defined by the data points by some distance.

In step 204, each data point is mapped to the respective cuboid that encompasses the location of the data point in the three dimensional volume. For example, returning to the cuboid dimensions defined in the previous example, and referring to the sample data set shown in Appendix A, the first 70 data points (1-70) will fall, horizontally, into one cuboid, and the remaining 71-101 data points into a different cuboid. This is because the top level cuboid is 100×100 meters horizontally, and the X values of 1-70 fit in the 100 meter extent of 7265xx.xx meters, and the Y values of 1-70 fall into the 100 meter extent of 20405xx.xx and 20406xx.xx meters. By contrast, the values 71-101 fall outside of that 100 meter extent, and thus must be represented, horizontally, by a different cuboid. It should be noted that the data shown in rows 1-70 will fall into separate cuboids vertically, and the previous discussion was limited only to a discussion of the horizontal dimensions of a cuboid for the purposes of illustration.

Table 1 displays how rows 1 and 33 from the sample data listed in Appendix A would be mapped into the cuboid levels described in the previous examples. Because each cuboid is 100 m×100 m in the X and Y directions respectively, the first row, containing the points (726,530.14, 2040506.13, 24.82), is mapped to the $7,265^{th}$ parent cuboid in the X direction, and the $20,405^{th}$ parent cuboid in the Y direction. This is because the point is $7,265^{th}$ interval above 0. If the point was located beyond 726,600 m it would be mapped into the $7,266^{th}$ cuboid. Further, because each cuboid is 20 m tall in the Z direction, the data point at 24.82 meters is further mapped to the $1^{st}$ cuboid in the Z direction (after the $0^{th}$ positive cuboid). The x and y mapping is intuitive because the horizontal dimensions are all posers of 10. However the Z mappings is not as intuitive, due to the fact that the Z dimensions are of each level cuboid are 20, 5, and 1. The Z value of 24.82 meters falls into the first 20 meter interval above 0, hence the ID of 1. Thus, the data point in the first row is mapped to the (7265, 20405, 1) parent cuboid.

TABLE 1

| Level | X | Y | Z | cuboid ID | | |
|---|---|---|---|---|---|---|
| 2 | 726530.14 | 2040506.13 | 24.82 | 7265 | 20405 | 1 |
| 1 | 726530.14 | 2040506.13 | 24.82 | 3 | 0 | 0 |
| 0 | 726530.14 | 2040506.13 | 24.82 | 0 | 6 | 4 |
| 2 | 726528.02 | 2040534.27 | −.05 | 7265 | 20405 | −0 |
| 1 | 726528.02 | 2040534.27 | −.05 | 2 | 3 | 0 |
| 0 | 726528.02 | 2040534.27 | −.05 | 8 | 4 | 0 |

Next, the first row data must be mapped to the child cuboids. Each 100 m×100 m×20 m parent cuboids is tessellated into a 10 m×10 m×5 m sub cuboids. The point in row 1 of the data listing would go into the sub cuboid of (3,0,0) inside the (7265, 20405, 1) top cube because the remaining unmapped values of 30.14, 06.13, 4.82, are in the $3^{rd}$, $0^{th}$ in the X and Y direction, respectively. The first child cuboid uses a 5 meter dimension for the Z axis, thus the remaining unmapped value of 4.82 m falls into $0^{th}$ subcuboid in the Z direction. Finally, the remaining values unmapped values of 8.02 m, 4.27 m, and 0.27 m are mapped into the (8,4,0) subcuboid (which is a 1×1×1 meter cube).

Row 33 is mapped in the same manner as row 1, however it is worth noting that −0.05 value falls within the first 20 meters below zero, hence the ID of −0. Thus, the parent cuboid of row 33 is (7265,20405, −0). Turning to the lower levels, 33 would go in the (2, 3,0) inside of (7265, 20405,−1), and (8,4,0) of the lowest level, according to the method described above.

Notice that the 2 least significant digits are not mapped to a cuboid. Instead, in step 206, in an exemplary embodiment, they may be stored as integer values in the lowest level cube, which in this case represents a full meter. Most other point attributes, such as intensity, number of returns, and scan angle, may all be collocated with the point record at this lowest cuboid level as raw integer values. If GPS time or other similar value is to be included, it must be scaled from a floating point value to an integer value. Nominally, GPS Time is scaled to microseconds. In an alternative embodiment, cubes may be recursively scaled beyond the significant figure and the smallest values may be simply mapped into the smallest cuboid.

If the collection of points occurs during multiple overlapping flight paths and the point source ID is used to differentiate the paths, the ID can be used to further separate the data at the top level. So a cuboid reference might look like 32-7265-20405-0, where the 32 is the point source ID. Separating overlapping collection paths helps in the compression of the GPS time field, which will be described below.

Referring again to FIG. 1, once the received data has been ordered into a data structure, it must be decomposed for compression in step 104. According to an embodiment, this method broadly comprises recording the origin of a reference cuboid at each level, then recording the remaining cuboids of that level as a distance from the reference cuboid or the most recently recorded cuboid.

Figure 4:
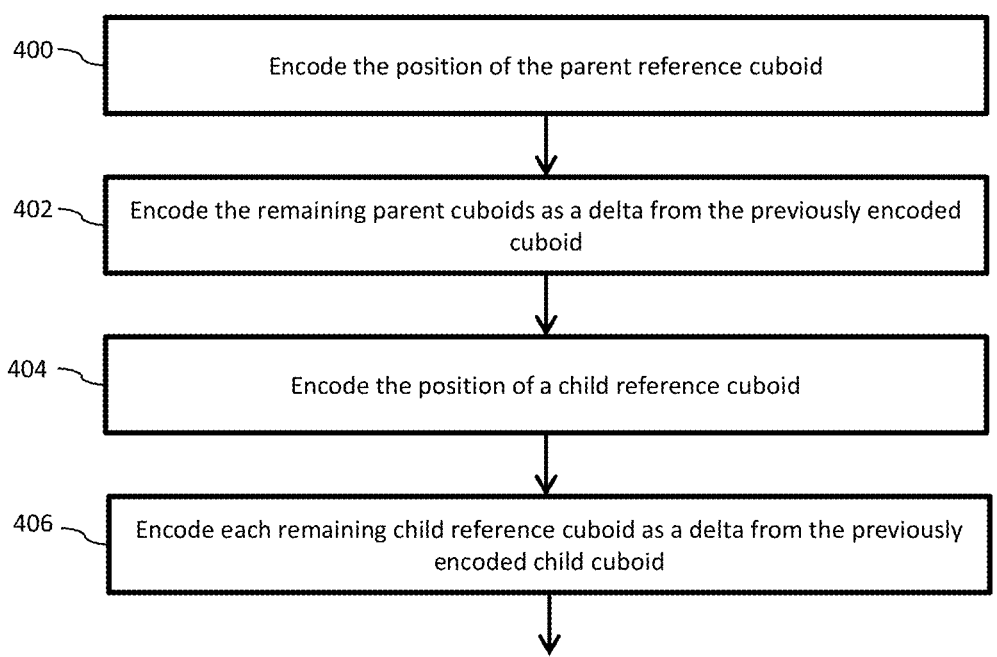
FIG. 4 shows a method according to an embodiment.

FIG. 4, shows a method of decomposing according to an embodiment. In step 400, the origin of a parent reference cuboid is encoded. The origin, in an exemplary embodiment, is the cuboid corner having the smallest xyz value. However, the origin may be any other predetermined position on the cuboid as long as it can serve as a marker for the position of the cuboid with respect to the other cuboids of the same level. Similarly, the reference cuboid, in an exemplary embodiment is a cuboid having the smallest xyz value. However, the reference cuboid may be any other cuboid, or any other point in the volume, as long as the position of the point or the cuboid may be recorded and serve as reference point for the remaining cuboids. The position of the reference may be encoded as actual xyz values. In an exemplary embodiment, the position may be only at the appropriate precision. In our working example, it is at a precision of 100 meters.

In step 402, the remaining cuboids' may be encoded as a delta from the previously encoded cuboid. In an exemplary embodiment, the cuboids may be processed in ascending order of xyz. For example, after the reference cuboid has been encoded, the nearest cuboid (referred to for the purposes of this example as $C_2$) may be encoded as a delta from the reference cuboid. The cuboid nearest to $C_2$ is then encoded as a delta from $C_2$. In an exemplary embodiment, only cuboids containing at least one data point are encoded. One of ordinary skill will recognize that, in alternative embodiments, other cuboids other than the nearest may be first encoded, and multiple reference points may be used. The deltas may be recorded in units of cuboids. Thus, in cases where there are no gaps in the data greater than the horizontal size of the cuboid, x deltas will be a long sequence of 1s. If there is a gap, the delta will represent how many cuboids of that dimension must be skipped. When the next cuboid is an increment in the Y axis, the x delta may be a negative value to bring the decoded x back to the left most side. The same approach may be used to encode changes in the Z origins if there are more than one cuboid for any one xy pair. In an exemplary embodiment, the xyz origin deltas are compressed using AMTF, which is described in the entropy coding section. The compressed list of origins may then be written to storage such as a hard disk.

Next, the above steps are repeated for the lower level cuboids in a similar manner. In step 404, a child reference cuboid or other reference point is first selected. This reference child cuboid may be recorded as a distance from the parent cuboid origin. For example, the smallest xyz value of the child reference cuboid may be mapped to the smallest xyz value of the parent cuboid Like the above steps, in step 406, all remaining cubes inside the current cube may be then encoded as a delta from the previous.

Because eliminating negative values improves various compression schemes, such as AMTF, a distance that would be recorded as a negative from the previous encoded cuboid may be instead be recorded as a positive from the reference or other predetermined point. For example, returning to the previous working example, tessellations of 10×5 meters on each side are used, the range of x and y values is restricted between 0 and 9, and the z values will be between 0 and 4. However, since this time the possible values cannot exceed 9, the value of 10 may be used as a sentinel code to indicate the x or y delta should return to the origin or other reference point. This is true because the range of −1 to −9 is replaced with the single value 10. This process could be repeated of all neighboring cuboids, and used recursively for all child cubes and parent cuboids.

In step 206, once the lowest level of cube origins have been processed, the residual data which was placed into cuboids as raw values may be encoded and compressed. The first value to be encoded is a delta from its enclosing cuboid's origin, and remaining point values are delta encoded for xyz just as before. A special sentinel values may also used here to return either the x or y back to its origin. The only difference this time is that now the other fields are also processed at this level. All the fields which are not time dependent and described below are encoded in the same xyz ascending order.

The number of returns (NR) and return number (RN) are related, so they may be compressed together. Although this creates a dependency between them for decompression, it is unlikely that one would be used without the other. Both values are encoded as actual values using AMTF. First NR is compressed, and then RN is compressed using its associated NR as a context. If NR for a point, it is highly likely that RN will also be 1, which will compress to near zero. If NR is 2, there is a 50% probability that RN will be 1 or 2.

Intensity may also compressed as an actual value, however NR&RN are used as context. It is likely that returns will be more intense when there was only one return for a pulse rather than the pulse being divided into multiple returns. This improves the probability model by associating high intensity values with low NRs and lower intensities with lower NRs. While this helps skew the probabilities, there is no guarantee that there won't be high intensities with high NRs, so the full range of possible values must still be supported.

Some fields compress better when they organized by scan order rather than xyz. GPS time and scan angel are two examples. For these cases, an position offset within each lowest cuboid may be encoded so that the scan order can be restored. The order tables in Appendix B are an example of the offsets used to encode the sample data. Appendix B shows data following compression.

Once the scan order has been restored with the cuboid, GPS time values are delta encoded, much like xy values. Scan angle is encoded with a simple run length encoding. The edge flag and scan direction are encoded with Bit Run Length Encoding.

One of ordinary skill will recognize that any compression encoding scheme may be used suitable for compressing the data described above. For example, the following encoding schemes may be used: Move to Front (MTF), Arithmetic coding, Run Length Encoding, and Bit Run Length Encoding.

For example, Move to Front (MTF) is a well know data transform which will not be described here in detail. It is used to improves probability models by keeping the most recently used values near the low end of a symbol list. A long sequence of identical values will result in a long series of zeros. Values that do not repeat but have a high degree of local correlation will use symbol values close to zero. This is accomplished by placing the most recently used value in the 0th position in an array and moving all the other values to the right. Values that appear only rarely will be pushed far to the right over time, and will have large index values as a result.

For another example, Arithmetic coding is a well known form of entropy encoding and will not be described in detail. This type of encoding works by assigning a range of probability to each symbol. The more skewed the probabilities are the better the compression efficiency is. If all encoded symbols have an equal probability, the number of bits needed to represent any of them is $\log^2$ (n) where n is the number of unique symbols; essentially having no compression. Using the MTF transform prior to arithmetic encoding helps skew the probability model towards symbol values near zero. When MTF and arithmetic encoding are used together in this system, it is referred to as AMTF.

For another example, Run Length Encoding is a form of data compression where the number of times a value is repeated is stored in place of the individual repeating values. This system uses 2 types of run length encoding. The first is used to record repeating byte sequences. The general approach for this is to write out the first occurrence of a value. If that value is immediately followed by the same value, it is written again, and then followed by the number of additional times it is repeated. If the repetition number is greater than the maximum number that can be represented by one byte (255), the original value is repeated again to indicate that an additional byte is required to hold the entire number of times the value repeats. This process is iterated as many times as necessary to hold the repetition. Finally the run length values are compressed using AMTF Finally, the second form of RLE is used to encode Boolean data. Since there are only two possible values for Boolean data, representing the data itself is not needed. Instead, only the length of the sequence is needed. It can be assumed that for every new run length, the value is the negation of the previous one. It does not matter which value comes first, so TRUE can be arbitrarily assigned to be the first value in the sequence. If FALSE happens to be the first, the run length that is written out will be zero. The repeating zeros are used as a sentinel to indicate that another byte is needed for the run length. If one or more zeros appears anywhere other than at the very beginning, it indicates that more than one byte is required to encode the run length. The number of bytes is 1+the number of zeros. Table 2 shows what a sequence of data, and the resulting encoded data might look like in hex format. Run length values are then encoded with AMTF.

TABLE 2

| 2 | 1 | 3 | 255 | 1234 |
|---|---|---|-----|------|
| 0 | 0 | 1 | 0 | 0 | 0 | 1 | .. | 1 | 0 | .. | 0 |

| 0 | 2 | 1 | 3 | FF | 0 | 4D2 |

Furthermore, a system may be used, comprising a non-transitory storage medium containing program code for describing the various functionalities described herein.

As will be appreciated by one skilled in the art, aspects of the present invention may be embodied/implemented as a computer system, method or computer program product. The computer program product can have a computer processor, for example, that carries out the instructions of a computer program. Accordingly, aspects of the present invention may take the form of an entirely hardware embodiment, an entirely software embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction performance system, apparatus, or device.

The program code may perform entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Although the present invention has been described in connection with a preferred embodiment, it should be understood that modifications, alterations, and additions can be made to the invention without departing from the scope of the invention as defined by the claims.

| Appendix A: Example Data | | | |
|---|---|---|---|
| | X | Y | Z |
| 1 | 72653014 | 204050613 | 2482 |
| 2 | 72652995 | 204050597 | 2034 |
| 3 | 72652979 | 204050688 | 1734 |
| 4 | 72652990 | 204050802 | 2097 |
| 5 | 72653001 | 204050914 | 2465 |
| 6 | 72653003 | 204051019 | 2589 |
| 7 | 72652997 | 204051118 | 2543 |
| 8 | 72652958 | 204051089 | 1586 |
| 9 | 72652945 | 204051185 | 1359 |
| 10 | 72652903 | 204051155 | 345 |
| 11 | 72652945 | 204051290 | 1456 |
| 12 | 72652933 | 204051386 | 1263 |
| 13 | 72652894 | 204051360 | 308 |

Appendix A: Example Data

| | X | Y | Z |
|---|---|---|---|
| 14 | 72652889 | 204051463 | 289 |
| 15 | 72652884 | 204051566 | 259 |
| 16 | 72652879 | 204051668 | 234 |
| 17 | 72652875 | 204051772 | 221 |
| 18 | 72652870 | 204051875 | 207 |
| 19 | 72652866 | 204051978 | 198 |
| 20 | 72652865 | 204052083 | 288 |
| 21 | 72652859 | 204052185 | 233 |
| 22 | 72652853 | 204052287 | 167 |
| 23 | 72652848 | 204052391 | 149 |
| 24 | 72652844 | 204052494 | 140 |
| 25 | 72652839 | 204052597 | 128 |
| 26 | 72652835 | 204052702 | 122 |
| 27 | 72652831 | 204052805 | 118 |
| 28 | 72652826 | 204052908 | 94 |
| 29 | 72652822 | 204053012 | 89 |
| 30 | 72652817 | 204053116 | 69 |
| 31 | 72652812 | 204053220 | 39 |
| 32 | 72652807 | 204053323 | 23 |
| 33 | 72652802 | 204053427 | −5 |
| 34 | 72652798 | 204053532 | −2 |
| 35 | 72652794 | 204053636 | −7 |
| 36 | 72652790 | 204053739 | −3 |
| 37 | 72652782 | 204053948 | 0 |
| 38 | 72652778 | 204054051 | 0 |
| 39 | 72652774 | 204054155 | −1 |
| 40 | 72652762 | 204054468 | 3 |
| 41 | 72652758 | 204054571 | 0 |
| 42 | 72652754 | 204054676 | −1 |
| 43 | 72652750 | 204054780 | −2 |
| 44 | 72652746 | 204054884 | −4 |
| 45 | 72652742 | 204054988 | 0 |
| 46 | 72652738 | 204055092 | 4 |
| 47 | 72652734 | 204055197 | −1 |
| 48 | 72652730 | 204055300 | 0 |
| 49 | 72652722 | 204055508 | 3 |
| 50 | 72652717 | 204055612 | 2 |
| 51 | 72652709 | 204055820 | 5 |
| 52 | 72652697 | 204056130 | −6 |
| 53 | 72652693 | 204056235 | −5 |
| 54 | 72652689 | 204056339 | −8 |
| 55 | 72652682 | 204056545 | 20 |
| 56 | 72652676 | 204056649 | −5 |
| 57 | 72652669 | 204056857 | −1 |
| 58 | 72652664 | 204056960 | 0 |
| 59 | 72652660 | 204057065 | 0 |
| 60 | 72652656 | 204057169 | 3 |
| 61 | 72652640 | 204057584 | 2 |
| 62 | 72652628 | 204057894 | −1 |
| 63 | 72652624 | 204057997 | −7 |
| 64 | 72652600 | 204058615 | 14 |
| 65 | 72652588 | 204058925 | 6 |
| 66 | 72652580 | 204059131 | 10 |
| 67 | 72652575 | 204059234 | −3 |
| 68 | 72652567 | 204059440 | 4 |
| 69 | 72652563 | 204059544 | 4 |
| 70 | 72652547 | 204059954 | 4 |
| 71 | 72652543 | 204060055 | 1 |
| 72 | 72652523 | 204060567 | 6 |
| 73 | 72652515 | 204060773 | 1 |
| 74 | 72652511 | 204060874 | −1 |
| 75 | 72652507 | 204060976 | 3 |
| 76 | 72652503 | 204061078 | −1 |
| 77 | 72652500 | 204061179 | 14 |
| 78 | 72652496 | 204061280 | 19 |
| 79 | 72652491 | 204061384 | 2 |
| 80 | 72652483 | 204061586 | 0 |
| 81 | 72652479 | 204061688 | 0 |
| 82 | 72652475 | 204061789 | 3 |
| 83 | 72652463 | 204062094 | −1 |
| 84 | 72652459 | 204062195 | 1 |
| 85 | 72652451 | 204062397 | −5 |
| 86 | 72652443 | 204062600 | −5 |
| 87 | 72652440 | 204062701 | 1 |
| 88 | 72652435 | 204062801 | −3 |
| 89 | 72652431 | 204062902 | −8 |
| 90 | 72652427 | 204063003 | −6 |
| 91 | 72652424 | 204063103 | −3 |
| 92 | 72652420 | 204063203 | −5 |
| 93 | 72652412 | 204063404 | 1 |
| 94 | 72652408 | 204063503 | 1 |
| 95 | 72652400 | 204063703 | −2 |
| 96 | 72652396 | 204063804 | −6 |
| 97 | 72652393 | 204063903 | 4 |
| 98 | 72652365 | 204064601 | −12 |
| 99 | 72652353 | 204064897 | −6 |
| 100 | 72652350 | 204064995 | 0 |
| 101 | 72652346 | 204065094 | −1 |

APPENDIX B

Compressed Sample Data

72650000_204050000_0-10.txt
12 2,0,3 0,1,−3 0,0,2 0,0,1 0,1,−3 0,1,0 0,1,0 0,1,0 0,1,0 0,1,0 0,1,0
72650000_204050000_0-10.txt.p0order
0
1
2
3
4
5
6
7
8
9
10
11
11
72650000_204050000_0-10.txt.struct
12
72650000_204050000_0-10.txt.x
0
0
0
0
0
0
0
0
0
0
0
72650000_204050000_0-10.txt.x0
2
72650000_204050000_0-10.txt.y0
0
72650000_204050000_0-10.txt.y1
1
0
0
1
1
1
1
1
1

1
1
72650000_204050000_0-10.txt.z
−3
−3
0
0
0
0
0
0
72650000_204050000_0-10.txt.z0
3
72650000_204050000_0-10.txt.z1
2
100
72650000_204050000_0-1.txt
1 9,6,2
8 8,3,3 0,1,−1 0,1,0 0,1,0 0,1,0 0,1,0 0,1,−1 1,−8,2
3 9,1,3 0,1,1 0,1,−2
1 9,0,0
9 8,0,2 0,1,0 0,1,−1 0,1,0 0,1,0 0,1,0 0,2,0 0,1,0 0,1,−1
5 7,9,0 1,−9,0 0,1,0 0,1,0 0,1,0
4 7,0,0 0,4,0 0,1,0 0,4,0
5 7,0,0 0,3,0 0,2,0 0,1,0 0,2,0
2 6,5,0 0,4,0
3 6,0,0 0,1,0 0,4,0
2 5,9,0 1,−3,0
4 5,1,0 0,3,0 0,1,0 0,4,0
72650000_204050000_0-1.txt.p0order
0
0
0
1
2
3
4
5
6
7
7
0
1
2
2
0
0
0
1
2
3
4
5
6
7
8
8
1
0
2
3
4
4
0
1
2
3
3
0
1
2
3
4
4
0
1
1
0
1
2
2
0
1
1
0
1
2
3
3
72650000_204050000_0-1.txt.struct
1
8
3
1
9
5
4
5
2
3
2
4
72650000_204050000_0-1.txt.x
0
0
0
0
0
0
1
0
0
0
0
0
0
0
1
0
0
0
0
0
0
0
0
0
0
0

0
1
0
0
0
72650000_204050000_0-1.txt.x0
9
8
9
9
8
7
7
7
6
6
5
5
72650000_204050000_0-1.txt.y
−8
−9
−3
72650000_204050000_0-1.txt.y0
6
3
1
0
0
9
0
0
5
0
9
1
72650000_204050000_0-1.txt.y1
1
1
1
1
1
1
1
1
1
1
1
1
1
1
1
2
1
1
1
1
1
4
1
4
3
2
1
2
4
1
4

3
1
4
72650000_204050000_0-1.txt.z
−1
0
0
0
0
−1
100
1
−2
0
−1
0
0
0
0
0
−1
0
0
0
0
0
0
0
0
0
0
0
0
0
0
0
0
72650000_204050000_0-1.txt.z0
2
3
3
0
2
0
0
0
0
0
0
72650000_204050000_0-0.txt
1 79,88,34
1 94,60,8
1 89,63,89
1 84,66,59
1 79,68,34
1 75,72,21
1 70,75,7
1 66,78,98
1 3,55,45
1 45,85,59
1 45,90,56
1 33,86,63
1 58,89,86
1 65,83,88
1 59,85,33
1 53,87,67

1 48,91,49
1 44,94,40
1 39,97,28
1 35,2,22
1 31,5,18
1 26,8,94
1 82,48,0
1 22,12,89
1 17,16,69
1 12,20,39
1 7,23,23
1 78,51,0
1 62,68,3
1 58,71,0
1 42,88,0
1 38,92,4
1 30,0,0
1 22,8,3
1 17,12,2
1 9,20,5
1 82,45,20
1 64,60,0
1 60,65,0
1 56,69,3
1 40,84,2
1 88,25,6
1 0,15,14
1 80,31,10
1 67,40,4
1 63,44,4
1 47,54,4
72650000_204050000_0-0.txt.p0order
0
0
0
0
0
0
0
0
0
0
0
0
0
0
0
0
0
0
0
0
0
0
0
0
0
0
0
0
0
0
0
0
0
0
0
0
0
0
0
0
0
0
0
0
0
0
0
0
0
0
0
0
0
0
0
0
0
0
0
0
72650000_204050000_0-0.txt.rn
17
34
17
17
17
17

| | |
|---|---|
| 17 | 1 |
| 17 | 1 |
| 34 | 1 |
| 18 | 1 |
| 17 | 5 1 |
| 18 | 1 |
| 34 | 1 |
| 17 | 1 |
| 17 | 1 |
| 17 | 10 1 |
| 17 | 1 |
| 17 | 1 |
| 17 | 1 |
| 17 | 1 |
| 17 | 15 1 |
| 17 | 1 |
| 17 | 1 |
| 17 | 1 |
| 17 | 1 |
| 17 | 20 1 |
| 17 | 72650000_204050000_0-0.txt.x0 |
| 17 | 79 |
| 17 | 94 |
| 17 | 89 |
| 17 | 25 84 |
| 17 | 79 |
| 17 | 75 |
| 17 | 70 |
| 17 | 66 |
| 17 | 30 3 |
| 17 | 45 |
| 17 | 45 |
| 17 | 33 |
| 17 | 58 |
| 17 | 35 65 |
| 17 | 59 |
| 17 | 53 |
| 17 | 48 |
| 17 | 44 |
| 72650000_204050000_0-0.txt.struct | 40 39 |
| 1 | 35 |
| 1 | 31 |
| 1 | 26 |
| 1 | 82 |
| 1 | 45 22 |
| 1 | 17 |
| 1 | 12 |
| 1 | 7 |
| 1 | 78 |
| 1 | 50 62 |
| 1 | 58 |
| 1 | 42 |
| 1 | 38 |
| 1 | 30 |
| 1 | 55 22 |
| 1 | 17 |
| 1 | 9 |
| 1 | 82 |
| 1 | 64 |
| 1 | 60 60 |
| 1 | 56 |
| 1 | 40 |
| 1 | 88 |
| 1 | 0 |
| 1 | 65 80 |
| 1 | 67 |
| 1 | 63 |

47
72650000_204050000_0-0.txt.y0
88
60
63
66
68
72
75
78
55
85
90
86
89
83
85
87
91
94
97
2
5
8
48
12
16
20
23
51
68
71
88
92
0
8
12
20
45
60
65
69
84
25
15
31
40
44
54
72650000_204050000_0-0.txt.z0
34
8
89
59
34
21
7
98
45
59
56
63
86
88
33
67
49

40
28
22
18
94
0
89
69
39
23
0
3
0
0
4
0
3
2
5
20
0
0
3
2
6
14
10
4
4
4
72650000_204050000_-2000-10.txt
6 2,3,3 0,1,0 0,1,0 0,1,0 0,1,0 0,2,0
72650000_204050000_-2000-10.txt.p0order
0
1
2
3
4
5
5
72650000_204050000_-2000-10.txt.struct
6
72650000_204050000_-2000-10.txt.x
0
0
0
0
0
72650000_204050000_-2000-10.txt.x0
2
72650000_204050000_-2000-10.txt.y0
3
72650000_204050000_-2000-10.txt.y1
1
1
1
1
2
72650000_204050000_-2000-10.txt.z
0
0
0
0
0
0
72650000_204050000_-2000-10.txt.z0

3
72650000_204050000_-2000-1.txt
4 7,5,4 0,1,0 0,1,0 1,−3,0
4 7,1,4 0,5,0 0,1,0 0,1,0
1 7,1,4
5 6,1,4 0,1,0 0,1,0 0,3,0 0,2,0
2 6,8,4 0,1,0
1 5,2,4
72650000_204050000_-2000-1.txt.p0order
0
1
2
3
3
0
1
2
3
3
0
0
0
1
2
3
4
4
0
1
1
0
0
72650000_204050000_-2000-1.txt.struct
4
4
1
5
2
1
72650000_204050000_-2000-1.txt.x
0
0
1
0
0
0
0
0
0
0
0
72650000_204050000_-2000-1.txt.x0
7
7
7
6
6
5
72650000_204050000_-2000-1.txt.y
−3
72650000_204050000_-2000-1.txt.y0
5
1
1
1
8
2
72650000_204050000_-2000-1.txt.y1
1
1
5
1
1
1
1
1
3
2
1
72650000_204050000_-2000-1.txt.z
0
0
0
0
0
0
0
0
0
0
72650000_204050000_-2000-1.txt.z0
4
4
4
4
4
4
72650000_204050000_-2000-0.txt
1 98,32,98
1 94,36,93
1 90,39,97
1 2,27,95
1 74,55,99
1 54,76,99
1 50,80,98
1 46,84,96
1 34,97,99
1 97,30,94
1 93,35,95
1 89,39,92
1 76,49,95
1 69,57,99
1 28,94,99
1 24,97,93
1 75,34,97
72650000_204050000_-2000-0.txt.p0order
0
0
0
0
0
0
0
0
0
0
0
0
0
0
0
0

0
0
0
0
0
0
0
0
0
0
0
0
0
0
0
0
0
72650000_204050000_-2000-0.txt.rn
17
17
17
17
17
17
17
17
17
17
17
17
17
17
17
17
72650000_204050000_-2000-0.txt.struct
1
1
1
1
1
1
1
1
1
1
1
1
1
1
1
1
72650000_204050000_-2000-0.txt.x0
98
94
90
2
74
54
50
46
34
97
93
89
76
69
28
24
75
72650000_204050000_-2000-0.txt.y0
32
36
39
27
55
76
80
84
97
30
35
39
49
57
94
97
34
72650000_204050000_-2000-0.txt.z0
98
93
97
95
99
99
98
96
99
94
95
92
95
99
99
93
97
72650000_204050000_2000-10.txt
4 2,0,0 0,1,1 1,−1,−1 0,1,1
72650000_204050000_2000-10.txt.p0order
0
2
1
3
3
72650000_204050000_2000-10.txt.struct
4
72650000_204050000_2000-10.txt.x
0
1
0
72650000_204050000_2000-10.txt.x0
2
72650000_204050000_2000-10.txt.y
100
72650000_204050000_2000-10.txt.y0
0
72650000_204050000_2000-10.txt.y1
1
1
72650000_204050000_2000-10.txt.z
1
100
1
72650000_204050000_2000-10.txt.z0

0
72650000_204050000_2000-1.txt
2 9,5,0 0,3,0
1 9,1,0
2 0,6,4 0,3,0
1 0,0,0
72650000_204050000_2000-1.txt.p0order
0
1
1
0
0
0
1
1
0
0
72650000_204050000_2000-1.txt.struct
2
1
2
1
72650000_204050000_2000-1.txt.x
0
0
72650000_204050000_2000-1.txt.x0
9
9
0
0
72650000_204050000_2000-1.txt.y0
5
1
6
0
72650000_204050000_2000-1.txt.y1
3
3
72650000_204050000_2000-1.txt.z
0
0
72650000_204050000_2000-1.txt.z0
0
0
4
0
72650000_204050000_2000-0.txt
1 95,97,34
1 90,2,97
1 97,18,43
1 14,13,82
1 1,14,65
1 3,19,89
72650000_204050000_2000-0.txt.p0order
0
0
0
0
0
0
0
0
0
0
0
0
0
72650000_204050000_2000-0.txt.rn
34
17
18
18
17
17
72650000_204050000_2000-0.txt.struct
1
1
1
1
1
1
72650000_204050000_2000-0.txt.x0
95
90
97
14
1
3
72650000_204050000_2000-0.txt.y0
97
2
18
13
14
19
72650000_204050000_2000-0.txt.z0
34
97
43
82
65
89
72650000_204060000_0-10.txt
5 2,0,0 0,1,0 0,1,0 0,1,0 0,1,0
72650000_204060000_0-10.txt.p0order
0
1
2
3
4
4
72650000_204060000_0-10.txt.struct
5
72650000_204060000_0-10.txt.x
0
0
0
0
72650000_204060000_0-10.txt.x0
2
72650000_204060000_0-10.txt.y0
0
72650000_204060000_0-10.txt.y1
1
1
1
1
72650000_204060000_0-10.txt.z
0
0
0
0
72650000_204060000_0-10.txt.z0
0

72650000_204060000_0-1.txt
4 5,0,0 0,5,0 0,2,0 0,2,0
6 4,2,0 0,1,0 0,2,0 0,1,0 0,1,0 1,−6,0
2 4,1,0 0,6,0
3 3,9,0 1,−5,0 0,1,0
1 3,9,0
72650000_204060000_0-1.txt.p0order
0
1
2
3
3
0
1
5
2
3
4
4
0
1
1
1
2
0
0
0
0
72650000_204060000_0-1.txt.struct
4
6
2
3
1
72650000_204060000_0-1.txt.x
0
0
0
0
0
0
0
0
1
0
1
0
72650000_204060000_0-1.txt.x0
5
4
4
3
3
72650000_204060000_0-1.txty
−6
−5
72650000_204060000_0-1.txt.y0
0
2
1
9
9
72650000_204060000_0-1.txt.y1
5
2
2
1
2
1
1
6
1
72650000_204060000_0-1.txt.z
0
0
0
0
0
0
0
0
0
0
0
72650000_204060000_0-1.txt.z0
0
0
0
0
72650000_204060000_0-0.txt
1 43,55,1
1 23,67,6
1 15,73,1
1 7,76,3
1 96,80,19
1 91,84,2
1 83,86,0
1 79,88,0
1 75,89,3
1 0,79,14
1 59,95,1
1 40,1,1
1 93,3,4
1 12,4,1
1 8,3,1
1 50,95,0
72650000_2040600000-0.txt.p0order
0
0
0
0
0
0
0
0
0
0
0
0
0
0
0
0
0
0
0
0
0

0
0
0
0
0
0
0
72650000_204060000_0-0.txt.rn
17
17
17
17
17
17
17
17
17
17
17
17
17
17
17
72650000_204060000_0-0.txt.struct
1
1
1
1
1
1
1
1
1
1
1
1
1
1
1
72650000_204060000_0-0.txt.x0
43
23
15
7
96
91
83
79
75
0
59
40
93
12
8
50
72650000_204060000_0-0.txt.y0
55
67
73
76
80
84
86

88
89
79
95
1
3
4
3
95
72650000_204060000_0-0.txt.z0
1
6
1
3
19
2
0
0
3
14
1
1
4
1
1
0
72650000_204060000_-2000-10.txt
6 2,0,3 0,1,0 0,1,0 0,1,0 0,1,0 0,1,0
72650000_204060000_-2000-10.txt.p0order
0
1
2
3
4
5
5
72650000_204060000_-2000-10.txt.struct
6
72650000_204060000_-2000-10.txt.x
0
0
0
0
0
72650000_204060000_-2000-10.txt.x0
2
72650000_204060000_-2000-10.txt.y0
0
72650000_204060000_-2000-10.txt.y1
1
1
1
1
1
72650000_204060000_-2000-10.txt.z
0
0
0
0
0
72650000_204060000_-2000-10.txt.z0
3
72650000_204060000_-2000-1.txt
1 5,8,4
1 5,0,4
5 4,0,4 0,3,0 0,3,0 0,2,0 0,1,0
5 3,8,4 1,−8,0 0,1,0 0,1,0 0,5,0

2 3,6,4 0,2,0
1 3,0,4
72650000_204060000_-2000-1.txt.p0order
0
0
0
0
0
1
2
3
4
4
1
2
3
0
4
4
0
1
1
0
0
72650000_204060000_-2000-1.txt.struct
1
1
5
5
2
1
72650000_204060000_-2000-1.txt.x
0
0
0
0
1
0
0
0
0
72650000_204060000_-2000-1.txt.x0
5
5
4
3
3
3
72650000_204060000_-2000-1.txt.y
−8
72650000_204060000_-2000-1.txt.y0
8
0
0
8
6
0
72650000_204060000_-2000-1.txt.y1
3
3
2
1
1
1
5
2
72650000_204060000_-2000-1.txt.z
0
0
0
0
0
0
0
0
0
72650000_204060000_-2000-1.txt.z0
4
4
4
4
4
4
72650000_204060000_-2000-0.txt
1 11,74,99
1 3,78,99
1 63,94,99
1 51,97,95
1 43,0,95
1 35,1,97
1 31,2,92
1 96,4,94
1 27,3,94
1 24,3,97
1 20,3,95
1 0,3,98
1 65,1,88
1 53,97,94
1 46,94,99
72650000_204060000_-2000-0.txt.p0order
0
0
0
0
0
0
0
0
0
0
0
0
0
0
0
0
0
0
0
0
0
0
0
0
0
0
72650000_204060000_-2000-0.txt.rn
17
17
17
17
17
17

17
17
17
17
17
17
17
17
17
72650000_204060000_-2000-0.txt.struct
1
1
1
1
1
1
1
1
1
1
1
1
1
1
1
1
1
72650000_204060000_-2000-0.txt.x0
11
3
63
51
43
35
31
96
27
24
20
0
065
53
46
72650000_204060000_-2000-0.txt.y0
74
78
94
97
0
1
2
4
3
3
3
3
1
97
94
72650000_204060000_-2000-0.txt.z0
99
99
99
95
95
97
92

94
94
97
95
98
88
94
99

What is claimed is:

1. A method of preparing a plurality of data points for transmission, comprising:
receiving a plurality of data points defining an N dimensional volume, such that each data point exists within a location in the volume;
ordering the received data points into a data structure dividing the N dimensional volume into a plurality of parent cuboids, wherein each parent cuboid further contains a plurality of child cuboids;
encoding the origin of at least a first parent cuboid, of the plurality of parent cuboids, as a first reference cuboid;
encoding a distance from the first reference cuboid to a second parent cuboid containing a data point;
encoding each remaining parent cuboid, of the plurality of parent cuboids, containing a data point as a distance from the most recently encoded parent cuboid;
encoding, for each encoded parent cuboid, the origin of a child reference cuboid;
encoding the distance from the child reference cuboid to another child cuboid containing a data point for each encoded parent cuboid; and
encoding each remaining child cuboid containing a data point as a distance from the most recently encoded child cuboid, wherein each encoded child cuboid having a negative distance from the previously encoded cuboid is encoded as a distance from a predetermined position having a positive distance value.

2. The method of claim 1, wherein the origin of the second parent cuboid is encoded as a distance from the origin of the first parent cuboid.

3. The method of claim 1, wherein each remaining parent cuboid is encoded in ascending order according to its position in the N dimensional volume.

4. The method of claim 1, wherein each remaining child cuboid is encoded in ascending order according to its position in the parent cuboid.

5. The method of claim 1, further comprising the step of transmitting the encoded data.

6. The method of claim 1, further comprising the step of encoding, for each data point, remaining location data in the child cuboid wherein the data point is mapped.

7. The method of claim 1, further comprising the step of further encoding the intensity of the data point, the number of returns of the data point, and the scan angle of the data point.

8. A method of preparing a plurality of data points for transmission, comprising:
receiving a plurality of data points defining an N dimensional volume, such that each data point exists within a location in the volume;
ordering the received data points into a data structure dividing the N dimensional volume into a plurality of parent cuboids, wherein each parent cuboid further contains a plurality of child cuboids;
encoding the origin of at least a first parent cuboid, of the plurality of parent cuboids, as a first reference cuboid;

encoding a distance from the first reference cuboid to a second parent cuboid, of the plurality of parent cuboids, containing a data point;

encoding each remaining parent cuboid containing a data point as a distance from the most recently encoded parent cuboid;

encoding, for each encoded parent cuboid, the origin of a child reference cuboid;

encoding the distance from the child reference cuboid to another child cuboid containing a data point for each encoded parent cuboid; and encoding each remaining child cuboid containing a data point as a distance from the most recently encoded child cuboid;

encoding, for each data point, the intensity of the data point, the number of returns of the data point, and the scan angle of the data point.

9. The method of claim 8, wherein the step of ordering the received data points, comprises the steps of:

parsing the N dimensional volume into a plurality of parent cuboids of a first predetermined dimension;

parsing each parent cuboid into a plurality of child cuboids of a second predetermined dimension, wherein the second predetermined dimension is a factor of the first predetermined dimension; and mapping each data point to the child cuboid containing the location of the data point in the N dimensional volume.

10. The method of claim 8, wherein the data structure is an octree data structure.

11. The method of claim 8, wherein the origin of the second parent cuboid is encoded as a distance from the origin of the first parent cuboid.

12. The method of claim 8, wherein each remaining parent cuboid is encoded in ascending order according to its position in the N dimensional volume.

13. The method of claim 8, wherein each remaining child cuboid is encoded in ascending order according to its position in the parent cuboid.

14. The method of claim 8, further comprising the step of transmitting the recorded data.

15. The method of claim 8, wherein for each encoded child cuboid having a negative distance from the previously encoded cuboid is encoded as a distance from a predetermined position having a positive distance value.

16. The method of claim 8, further comprising the step of encoding, for each data point, remaining location data in the child cuboid wherein the data point is mapped.

17. A nontransitory storage medium storing program code configured to prepare a plurality of data points for transmission, comprising:

program code for receiving a plurality of data points defining an N dimensional volume, such that each data point exists within a location in the volume;

program code ordering the received data points into a data structure dividing the N dimensional volume into a plurality of parent cuboids, wherein each parent cuboid further contains a plurality of child cuboids;

program code for encoding the origin of at least a first parent cuboid, of the plurality of parent cuboids, as a first reference cuboid;

program code for encoding a distance from the first reference cuboid to a second parent cuboid, of the plurality of parent cuboids, containing a data point;

program code for encoding each remaining parent cuboid containing a data point as a distance from the most recently encoded parent cuboid;

program code for encoding, for each encoded parent cuboid, the origin of a child reference cuboid;

program code for encoding the distance from the child reference cuboid to another child cuboid containing a data point for each encoded parent cuboid; and program code for encoding each remaining child cuboid containing a data point as a distance from the most recently encoded child cuboid, wherein each encoded child cuboid having a negative distance from the previously encoded cuboid is encoded as a distance from a predetermined position having a positive distance value.

18. A nontransitory storage medium storing program code configured to prepare a plurality of data points for transmission, comprising:

program code for receiving a plurality of data points defining an N dimensional volume, such that each data point exists within a location in the volume;

program code ordering the received data points into a data structure dividing the N dimensional volume into a plurality of parent cuboids, wherein each parent cuboid further contains a plurality of child cuboids;

program code for encoding the origin of at least a first parent cuboid, of the plurality of parent cuboids, as a first reference cuboid;

program code for encoding a distance from the first reference cuboid to a second parent cuboid, of the plurality of parent cuboids, containing a data point;

program code for encoding each remaining parent cuboid containing a data point as a distance from the most recently encoded parent cuboid;

program code for encoding, for each encoded parent cuboid, the origin of a child reference cuboid;

program code for encoding the distance from the child reference cuboid to another child cuboid containing a data point for each encoded parent cuboid;

program code for encoding each remaining child cuboid containing a data point as a distance from the most recently encoded child cuboid; and program code for encoding, for each data point, the intensity of the data point, the number of returns of the data point, and the scan angle of the data point.

* * * * *